United States Patent [19]

Bannon

[11] Patent Number: 4,933,047

[45] Date of Patent: Jun. 12, 1990

[54] CHIMNEY TRAY HAT

[75] Inventor: Robert P. Bannon, Houston, Tex.

[73] Assignee: Shell Oil Company, Houston, Tex.

[21] Appl. No.: 327,206

[22] Filed: Mar. 22, 1989

[51] Int. Cl.[5] .......................... B01D 3/00; B01D 19/00
[52] U.S. Cl. ....................................... 202/197; 55/185;
   55/463; 55/465; 55/466; 196/136; 261/114.2
[58] Field of Search ........................ 202/197; 203/40;
   55/462–466, 183, 185; 196/103, 136; 261/114.2

[56] References Cited

U.S. PATENT DOCUMENTS

| | | | |
|---|---|---|---|
| 20,562 | 6/1858 | Howarth | 202/177 |
| 59,334 | 10/1866 | Collins | 196/103 |
| 335,281 | 2/1866 | Goldwater | 196/99 |
| 443,328 | 12/1890 | McGowan | 196/102 |
| 1,326,230 | 12/1919 | Tilburg | 196/99 |
| 1,918,005 | 7/1933 | Urquhart | 55/463 |
| 2,055,048 | 9/1936 | Puls | 55/462 |
| 2,353,833 | 7/1944 | Kimmell | 55/185 |
| 2,986,233 | 5/1961 | Yap et al. | 55/464 |
| 3,334,027 | 8/1967 | Goeldner | 203/40 |
| 3,501,400 | 3/1970 | Brody | 208/361 |
| 4,235,706 | 11/1980 | Bannon | 208/347 |
| 4,247,368 | 1/1981 | Bannon et al. | 202/158 |
| 4,274,944 | 6/1981 | Bannon | 208/352 |
| 4,308,130 | 12/1981 | Bannon | 208/352 |
| 4,308,131 | 12/1981 | Bannon | 208/353 |
| 4,687,550 | 8/1987 | Wong | 202/165 |
| 4,698,138 | 10/1987 | Silvey | 203/91 |

Primary Examiner—Joye L. Woodard
Attorney, Agent, or Firm—Pamela J. McCollough

[57] ABSTRACT

The invention therefore relates to a chimney tray hat apparatus for de-entraining droplets of liquid entrained in a stream containing vapor and liquid droplets flowing upwardly through a tray chimney in a vapor/liquid processing device, the chimney tray hat apparatus comprising a top cover or hat having an upper side and an underside which intercepts entrained liquid droplets flowing upwardly through the tray chimney, supports for supporting the chimney tray hat directly above the tray chimney, and a catcher ring and gutter for collecting the liquid impinging on the underside of the top cover and draining the liquid onto the supports and through the tray chimney.

14 Claims, 4 Drawing Sheets

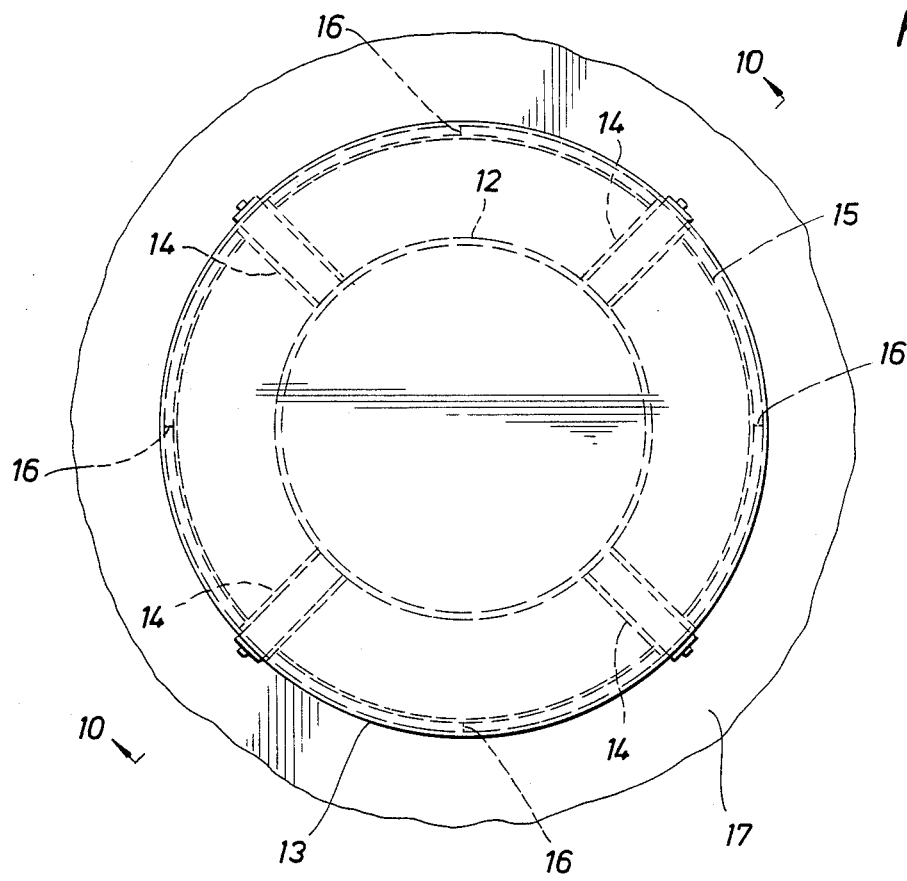
FIG. 7
FIG. 9
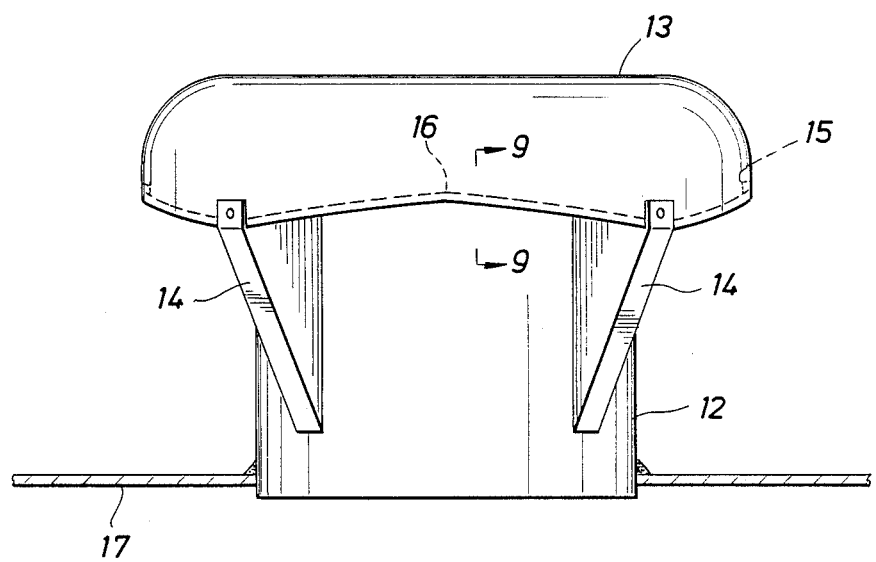
FIG. 8

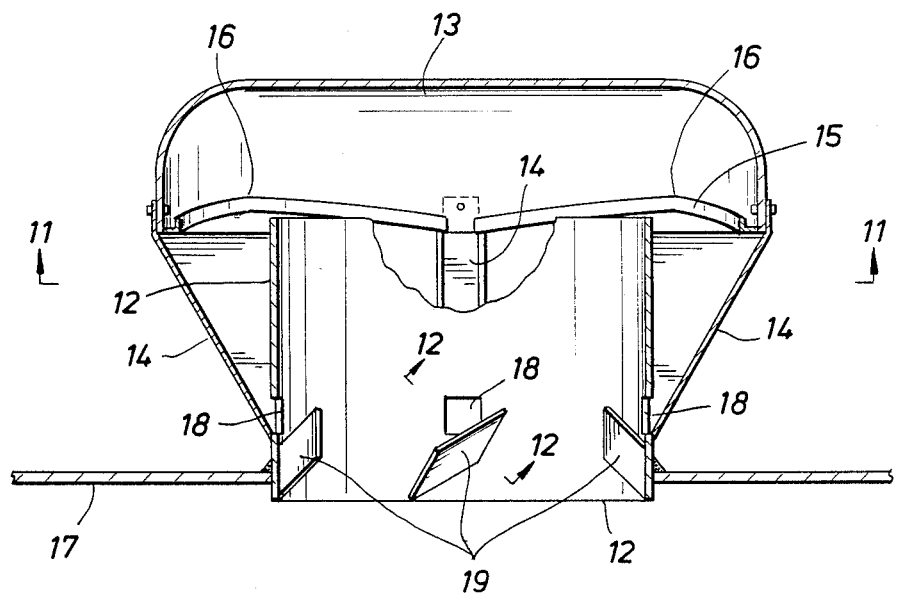
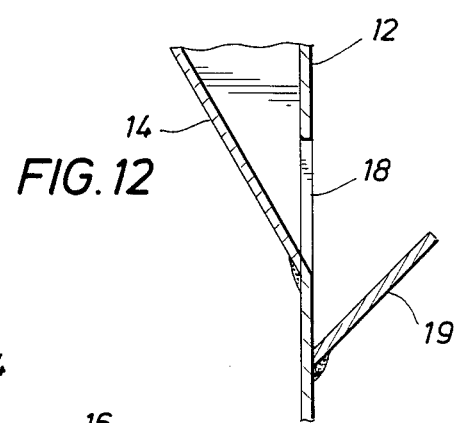
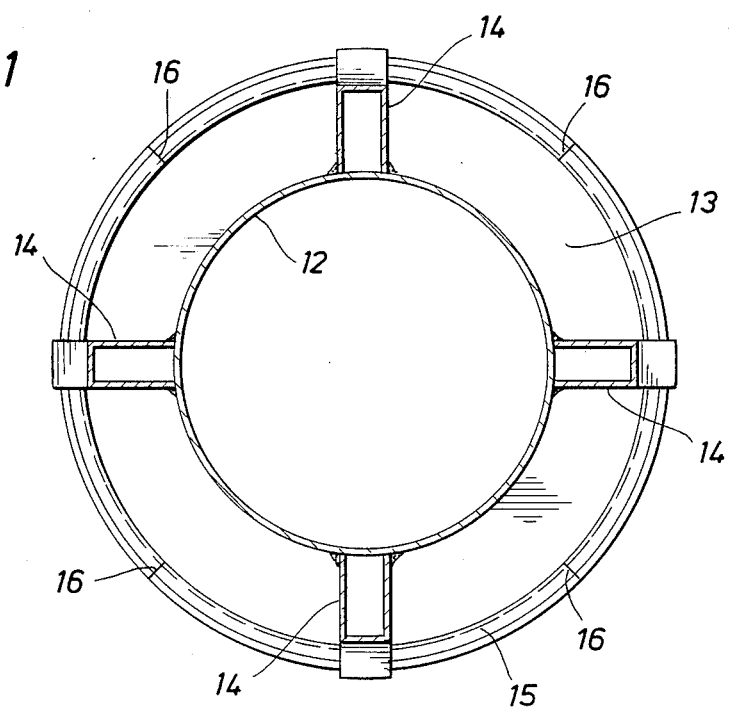

CHIMNEY TRAY HAT

FIELD OF THE INVENTION

This invention relates to an apparatus for use above a tray chimney in a tray deck located above an entry zone of a vapor/liquid processing device which removes droplets of liquid entrained in a vaporous stream as it leaves the entry zone.

BACKGROUND OF THE INVENTION

In many vapor/liquid contacting devices such as, for example, distillation columns, the feed is a two-phase mixture. In such columns, the feed zone acts as a phase separator with vapor rising upwardly through contacting devices and the liquid moving downwardly through contacting devices or out of the bottom of the column. In many applications, such as, for example, crude oil distilling columns, vacuum flashers, lube oil fractionators and olefin plant pyrolysis fractionators, entrainment of feed liquid with the vapor flowing upwardly from the feed zone is detrimental because it contaminates distillate products. Usually such columns have a trayed or packed section whose sole purpose is to remove the entrained feed liquid. In such columns, the lowermost tray of this section, i.e., the first tray above the feed zone, is most often a chimney tray.

Tray chimneys are conduits, usually circular that pass vapor through the tray deck to avoid direct contact with the liquid on the deck. The chimney invariably has a hat to deflect and diffuse the vapor jet so that it does not impinge directly on the underside of the contacting device above. In present practice, this hat is flat or cone shaped and is slightly larger than the chimney cross section. The hat is mounted directly above the chimney so that the vapor must make a 90° turn to pass through the space between the top edge of the chimney and the hat. Some of the liquid drops being carried along with the vapor will impinge on the hat and will drain or be blown to the edge of the hat. With presently used hats, the impinged liquid will be torn off the edge of the hat by the vapor flow and will be re-entrained in it. Accordingly, a need has existed for an improved chimney tray hat which intercepts liquid flowing across the underside of the hat and prevents its re-entrainment. The present invention is a chimney tray hat equipped with a device to collect the liquid and subsequently direct the liquid such that it drains, preferably back through the chimney, to the zone below.

SUMMARY OF THE INVENTION

The invention therefore relates to a chimney tray hat for de-entraining droplets of liquid entrained in a stream containing vapor and liquid droplets flowing upwardly through a tray chimney in a vapor/liquid processing device, said chimney tray hat comprising a top cover having an upper side and an underside which intercepts entrained liquid flowing upwardly through said tray chimney, a means for supporting said chimney tray hat directly above said tray chimney, a means for collecting said liquid impinging on said underside of said top cover and a means for draining said liquid from said collecting means.

BRIEF DESCRIPTION OF THE DRAWINGS

FIG. 7 is a top view of another embodiment of the chimney tray hat of the present invention.

FIG. 8 is a side view of the chimney tray hat embodiment depicted in FIG. 7.

FIG. 9 is a cross-sectional view of the gutter of FIG. 8 along section 9—9.

FIG. 10 is a cross-section of FIG. 7 along section 10—10.

FIG. 11 is a cross-section looking up the chimney tray hat embodiment depicted in FIG. 10 taken along section 11—11.

FIG. 12 is a cross-section of FIG. 10 along 12—12.

DETAILED DESCRIPTION OF THE INVENTION

The present invention relates to an apparatus for de-entraining liquid entrained in a vapor stream. It employs a circular tray chimney extending through a tray deck located above an entry zone of a vapor/liquid contacting or separating vessel through which a vapor stream having liquid entrained therein flows upwardly, and a circular chimney tray hat having a diameter greater than that of the tray chimney and equipped with a means for collecting the liquid impacting on the underside of the hat and draining said liquid downwardly below the tray deck, preferably via the tray chimney. The purpose of the invention is to remove droplets of liquid entrained in the vapor stream as it leaves the entry zone through the chimney of the tray deck. The removal of these droplets is accomplished by the designed features of the apparatus, which collect and direct the entrained liquid droplets back into the entry zone. A stream of vapor and liquid passes upwardly through the tray chimney, at least a portion of the liquid comes into contact with the underside of the chimney tray hat and is collected by means of a gutter through which the collected liquid drains downwardly to the entry zone below the tray deck, preferably via the chimney.

As used herein, the term "entry zone" refers to a zone through which any process stream containing a mixture of vapor and liquid enters a vapor/liquid processing device. The term "tray", as used herein, refers to vapor/liquid contacting trays including bubble cap, valve type, or perforated plate trays, or modifications thereof, as well as equivalent structures. The term "tray deck", as used herein, refers to a plate in a vapor/liquid processing device upon which one or more chimneys is supported. With the exception of the chimneys, there are no other passageways in the tray deck through which vapor can flow. The term "distillation column", as used herein, includes any vapor/liquid contacting device and is understood to include one structure, or two or more such units in series. The term "separating device", as used herein, refers to a vessel used primarily for the separation of vapor and liquid. The term "vapor/liquid processing device", as used herein, includes distillation columns and separating devices as above defined.

Figure 1:
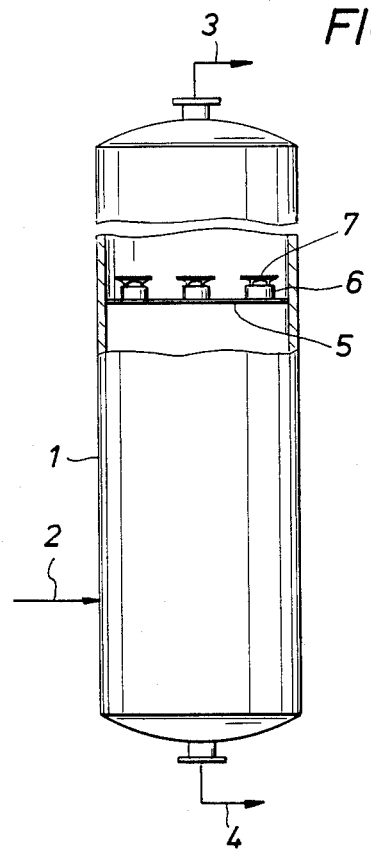
FIG. 1 is a partial cross-section of a distillation column or vapor/liquid processing device employing the chimney tray hat of the present invention.

FIG. 1 shows a partial cross-section of a distillation column employing the chimney tray hat apparatus of the present invention. As illustrated in FIG. 1, a multicomponent liquid, such as crude oil, enters a conventional multiple tray fractional distillation column 1 via line 2. The liquid is fractionally distilled to produce an overhead fraction (line 3), and a bottoms fraction (line 4). For simplicity, only one tray deck, 5, is shown, although in practice, columns containing multiple liquid entry zones can contain a multiple number of trays decks. The fractional distillation column 1 is also equipped with a tray chimney 6 and a chimney tray hat or top cover 7 which is equipped with a means for collecting liquid droplets entrained in the vapor stream and draining the liquid collected downwardly, preferably through the tray chimney, into the zone below the tray deck.

Figure 2:
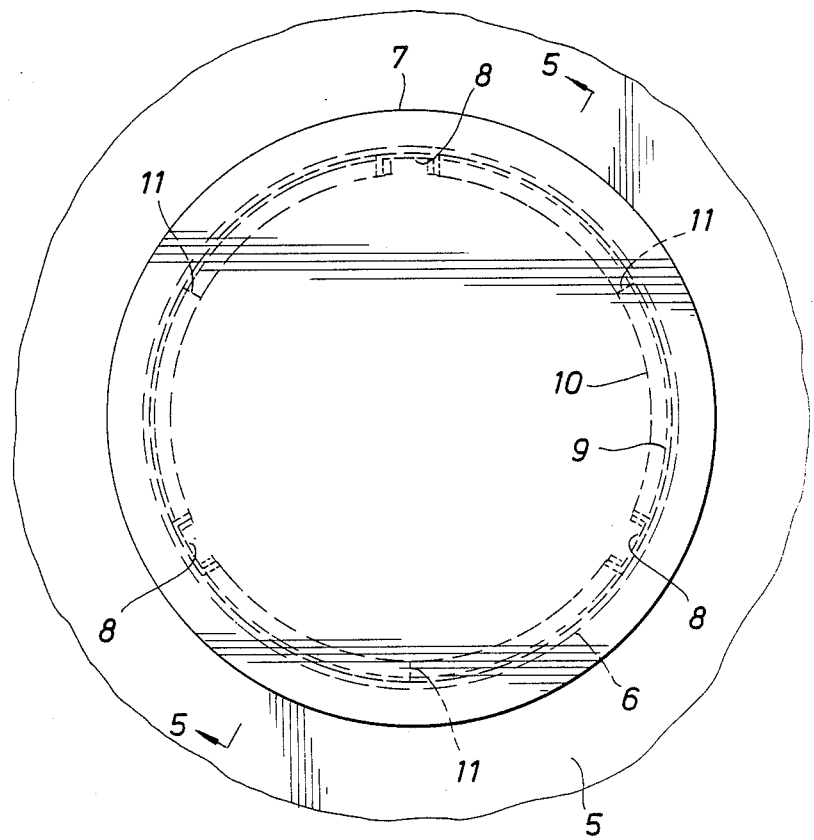
FIG. 2 is a top view of one embodiment of the chimney tray hat of the present invention.
Figure 3:
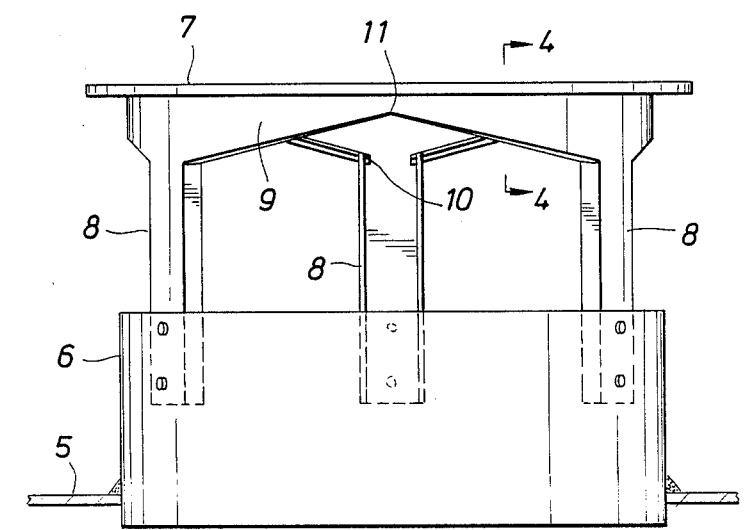
FIG. 3 is a side view of the chimney tray hat of FIG. 2.

A first embodiment of the present invention is illustrated in FIGS. 2-6. This embodiment is typically used for vacuum columns where pressure drop is critical. In this embodiment, as shown in FIG. 3, the vapor makes a 90° turn to pass through the space between the top edge of the tray chimney and the chimney tray hat. The chimney tray hat in this embodiment is typically flat and is equipped with a gutter assembly comprising a catcher ring to intercept liquid flowing on the underside of the hat and a gutter or channel device through which the liquid drains back into the tray chimney.

In FIG. 2, corresponding numerals represent corresponding elements of FIG. 1. FIG. 2 is a top view of a first embodiment of the chimney tray hat apparatus of the present invention. The chimney tray hat 7 is attached to the tray chimney 6 by means of hat supports 8 which space the chimney tray hat 7 from the tray chimney 6. While the embodiment depicted in FIG. 2 shows three hat supports, it is within the scope of the invention to use any number of hat supports. Typically, the number of hat supports will range from 1 to about 4. The chimney tray hat 7 comprises an upper side and an underside. The underside chimney tray hat 7 is equipped with a gutter assembly comprising a catcher ring 9 and a gutter 10.

FIG. 3 is a side view of the chimney tray hat of the first embodiment of the present invention. As shown in FIG. 3, tray chimney 6 extends from tray deck 5. Located directly above tray chimney 6 is chimney tray hat 7 which is attached to tray chimney 6 by means of hat supports 8. The hat supports can be bolted to the chimney, welded to the chimney or attached by any other means which accomplishes the same purpose. The underside of chimney tray hat 7 is equipped with a gutter assembly comprising a catcher ring 9 and a gutter 10. In this embodiment, and as depicted in FIG. 3, the gutter assembly comprising catcher ring 9 and gutter 10 is located above the top of tray chimney 6. Catcher ring 9 is attached substantially perpendicular to the underside of the top cover or chimney tray hat 7 and has a diameter equal to or less than, preferably less than, that of chimney tray hat 7 and gutter 10 is a channel or conduit which is typically U-shaped or V-shaped and which is inwardly and upwardly directed whereby liquid draining down catcher ring 9 is collected in gutter 10. In this embodiment, gutter 10 is a channel or conduit which is provided with peaks 11 which are spaced between hat supports 8 and which provide slopes to aid the drainage of liquid which is collected by catcher ring 9 and gutter 10. In operation, the vapor stream having liquid droplets entrained therein passes upwardly through tray chimney 6. The momentum of the droplets causes them to contact the underside of chimney tray hat 7 and adhere thereto, thus forming a liquid film. The liquid film is swept toward catcher ring 9 by the action of the flowing vapor stream and then drains downwardly on catcher ring 9 and is collected in gutter 10. Gutter 10 is equipped with peaks 11 which are located along catcher ring 9 between hat supports 8. Peaks 11 provide a means for the liquid collected in gutter 10 to efficiently drain downwardly onto hat supports 8 and back into tray chimney 6. While peaks 11 enhance efficient drainage, it is understood that with a sufficiently deep gutter, draining could effectively be accomplished without peaks 11 being present.

Figure 4:
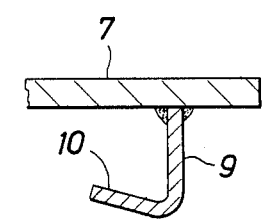
FIG. 4 is a cross-sectional view of the gutter of FIG. 3 along section 4—4.

FIG. 4 is a portion of the cross-sectional view of FIG. 3 along section 4—4. It shows the chimney tray hat 7, the catcher ring 9 and the gutter 10.

Figure 5:
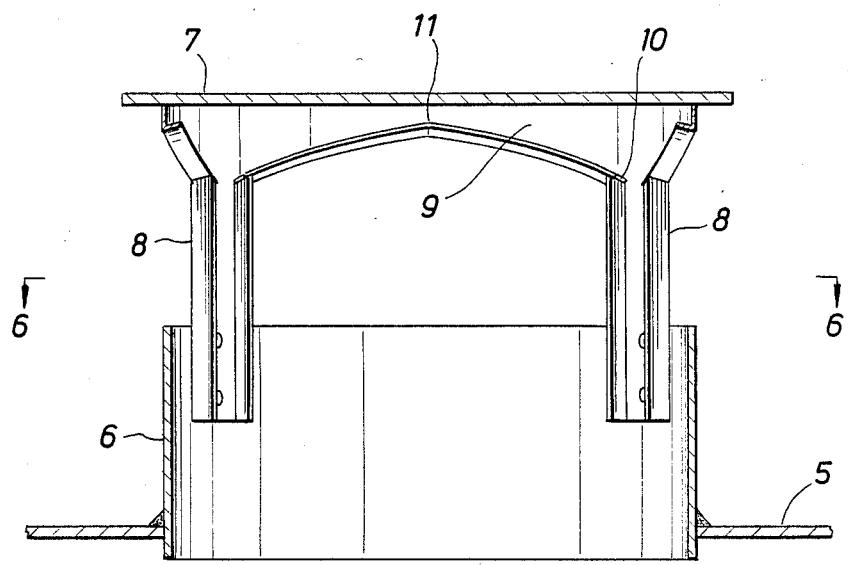
FIG. 5 is a cross-section as indicated in FIG. 2 along section 5—5.

FIG. 5 is a cross-sectional view as indicated in FIG. 2 taken along section 5—5. It shows the tray deck 5, the tray chimney 6 through which the vapor having liquid droplets entrained therein flows upwardly until it reaches the underside of chimney tray hat 7. When the liquid droplets reach the underside of the chimney tray hat, they collect thereon and ar swept to catcher ring 9 whereupon they drain downwardly into gutter 10. Gutter 10 is equipped with peaks 11 which are located between hat supports 8. The hat supports 8 are located at the lowest points of gutter 10 and thereby provide for the draining of liquid onto the hat supports 8. The liquid thereafter drains into tray chimney 6 having been deentrained from the vapor steam.

Figure 6:
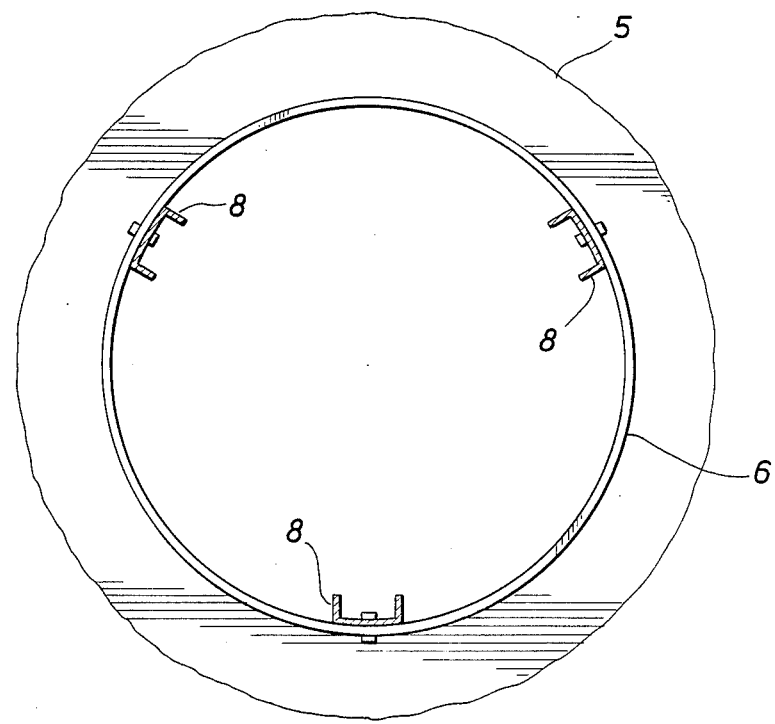
FIG. 6 is a cross-section as indicated in FIG. 5 along section 6—6.

FIG. 6 is a cross-section as indicated in FIG. 5 along section 6—6. It shows the attachment of hat supports 8 to the tray chimney 6 and the preferred equidistant position of the hat supports to each other.

A second embodiment of the present invention is depicted in FIGS. 7-12. This embodiment is useful for applications in which pressure drop is not critical. In this embodiment, as shown in FIG. 8, the vapor must make a 180° turn under the hat which will cause a larger fraction of the entrained liquid to impact on the hat and be collected. The chimney tray hat in this embodiment is typically a concave cover-type hat equipped with a gutter or channel device to collect liquid flowing downwardly on the underside of the hat and direct it back into the tray chimney.

FIG. 7 is a top view of the second embodiment of the chimney tray hat apparatus of the instant invention. As shown in FIG. 7, chimney tray hat 13 is attached to and spaced apart from tray chimney 12 by means of hat supports 14. Chimney tray hat 13 is equipped with gutter 15 for collecting entrained liquid. In this embodiment, gutter 15 is provided with peaks 16 which are located between hat supports 14 to provide a means for downward movement of liquid which has been collected in gutter 15. Peaks 16 enhance draining efficiency, but may not be necessary if the gutter is sufficiently deep. Although FIG. 7 shows the apparatus containing four hat supports, there can be a lesser number of supports or a greater number of supports with the only requirement being that the chimney tray hat 13 be supported at a distance above tray chimney 12 in order to provide a passageway for movement of the vapor stream.

FIG. 8 is a side view of the chimney tray hat apparatus depicted in FIG. 7. As shown in FIG. 8, a tray deck 17 is provided with a tray chimney 12 and a chimney tray hat 13 located a distance from the tray chimney 12. Hat supports 14 space the chimney tray hat 13 from the tray chimney 12. In operation, the vapor stream having liquid droplets entrained therein would pas upwardly through the tray chimney 12 and be directed downwardly as it contacts the underside of chimney tray hat 13. The liquid droplets that impact on the hat would then be collected by gutter 15 which is located below the top of tray chimney 12 is connected to the underside of the hat and which is slightly sloped downwardly toward the points where chimney tray hat 13 is attached to hat supports 14. The liquid droplets collected in gutter 15 would then drain down the hat supports 14 and back into the tray chimney 12.

FIG. 9 is a cross-sectional view of the outer edge of the chimney tray hat of FIG. 8 taken along section 9—9. It shows the attachment of gutter 15 to chimney tray hat 13. Gutter 15 is inwardly and upwardly directed to provide a means for collecting liquid running down the underside of chimney tray hat 13.

FIG. 10 is a cross-section of FIG. 7 along section 10—10 and shows the tray deck 17 which is provided with a tray chimney 12 and a chimney tray hat 13. Hat supports 14 space the chimney tray hat above the tray chimney 12. The hat supports shown are triangular in shape although other shapes and types of supports could be utilized. The tray chimney 12 is provided with openings 18 and baffles 19 at the point where hat supports 14 are attached to tray chimney 12 to provide a means for liquid droplets collected in gutter 15 to drain downwardly along hat supports 14 and into tray chimney 12.

FIG. 11 is a cross-sectional view looking up at the chimney tray hat apparatus depicted in FIG. 10 taken along section 11—11. It shows chimney tray hat 13 attached to tray chimney 12 by means of hat supports 14. Chimney tray hat 13 is equipped with gutter 15 for collecting liquid droplets entrained in a vapor stream. Gutter 15 is a conduit which has peaks 16 located between hat supports 14 which provide for the downward movement of liquid which has been collected in gutter 15.

FIG. 12 is a cross-sectional view of FIG. 10 taken along section 12—12. It shows tray chimney 12 which is provided with openings 18 positioned to provide for the drainage of liquid from hat supports 14 attached to tray chimney 12. Optionally, baffles 19 are positioned below openings 18 to provide for concentration of the liquid droplets against the wall of tray chimney 12 and thus, to prevent re-entrainment of the liquid droplets. In operation, the liquid droplets which are collected in gutter 15 drain down hat supports 14 into openings 18 which are equipped with baffles 19 and into tray chimney 12.

One skilled in the art can readily determine the proper size, number and height of tray chimneys to be used on a given tray deck and the height of the chimney tray hat above the top of the tray chimney. It is understood that the velocity of vapor passing upwardly through the tray chimney in the described embodiments must be low enough to permit the countercurrent flow of the concentrated stream of de-entrained liquid.

While specific embodiments of the apparatus of the present invention have been shown and described, it should be apparent that many modifications can be made thereto without departing from the spirit and scope of the invention. Accordingly, the invention is not limited by the foregoing description, but is only limited by the scope of the claims appended thereto.

I claim as my invention:

1. A chimney tray hat apparatus in combination with a tray chimney in a vapor/liquid processing device for de-entraining droplets of liquid entrained in a stream containing vapor and liquid droplets flowing upwardly through the tray chimney, said chimney tray hat apparatus comprising a top cover having an upper side and an underside which intercepts entrained liquid flowing upwardly through the tray chimney, a gutter means for collecting and draining said liquid impinging on said underside of said top cover onto a means for supporting said top cover directly above said tray chimney and through said tray chimney into a zone located below said tray chimney.

2. The chimney tray hat apparatus of claim 1 wherein said means for supporting comprises from 1 to about 4 supports.

3. The chimney tray hat apparatus of claim 2 wherein said top cover and said tray chimney are circular, and said top cover has a diameter greater than that of said tray chimney.

4. The chimney tray hat apparatus of claim 1 wherein said gutter means is located above the top of said tray chimney.

5. The chimney tray hat apparatus of claim 4 wherein said gutter means comprises a catcher ring attached to the underside of the top cover and a gutter extending from said catcher ring.

6. The chimney tray hat apparatus of claim 5 wherein said gutter is inwardly and upwardly directed to provide for the interception of said liquid flowing downwardly on said catcher ring.

7. The chimney tray hat apparatus of claim 5 wherein said gutter has peaks to provide for efficient drainage of said liquid from said gutter onto said supporting means.

8. The chimney tray hat apparatus of claim 5 wherein said top cover is circular and said catcher ring has a diameter less than or equal to that of said top cover.

9. The chimney tray hat apparatus of claim 8 wherein said catcher ring has a diameter less than that of said top cover.

10. The chimney tray hat apparatus of claim 1 wherein said gutter means is located below the top of said tray chimney.

11. The chimney tray hat apparatus of claim 10 wherein said gutter means has peaks to provide for efficient drainage of said liquid from said gutter means onto said supporting means.

12. The chimney tray hat apparatus of claim 10 wherein said top cover is a concavedly downwardly shaped cover having said gutter means attached to the bottom edge of said cover.

13. The chimney tray hat apparatus of claim 12 wherein said gutter means is inwardly and upwardly directed to provide for the interception of said liquid flowing downwardly on said underside of said top cover.

14. The chimney tray hat apparatus of claim 1 wherein said gutter means has peaks to provide for efficient drainage of said liquid from said gutter means onto said supporting means.

* * * * *